R. WHIPPLE.
TRACTOR.
APPLICATION FILED APR. 28, 1919.
1,326,314. Patented Dec. 30, 1919.
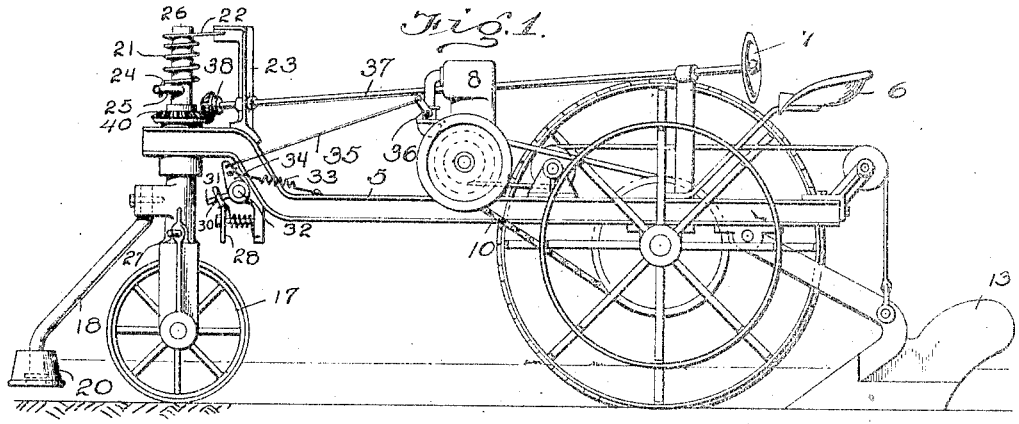
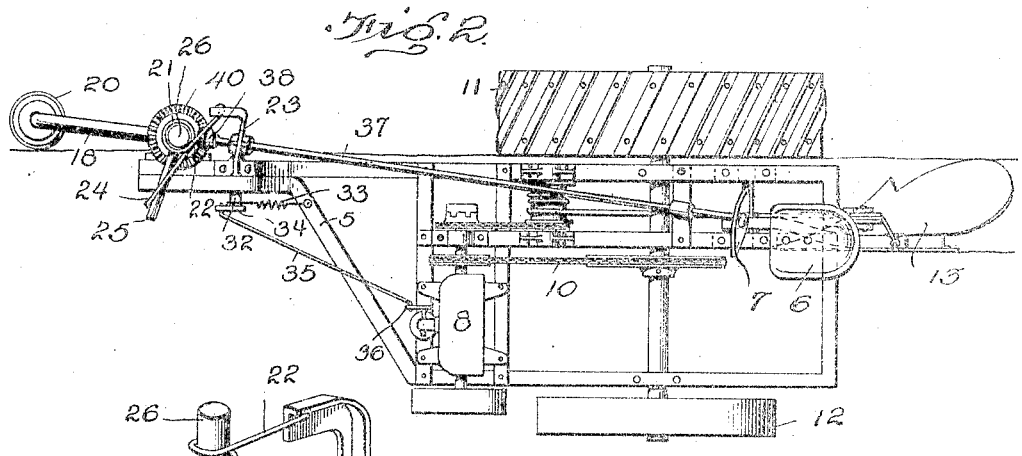
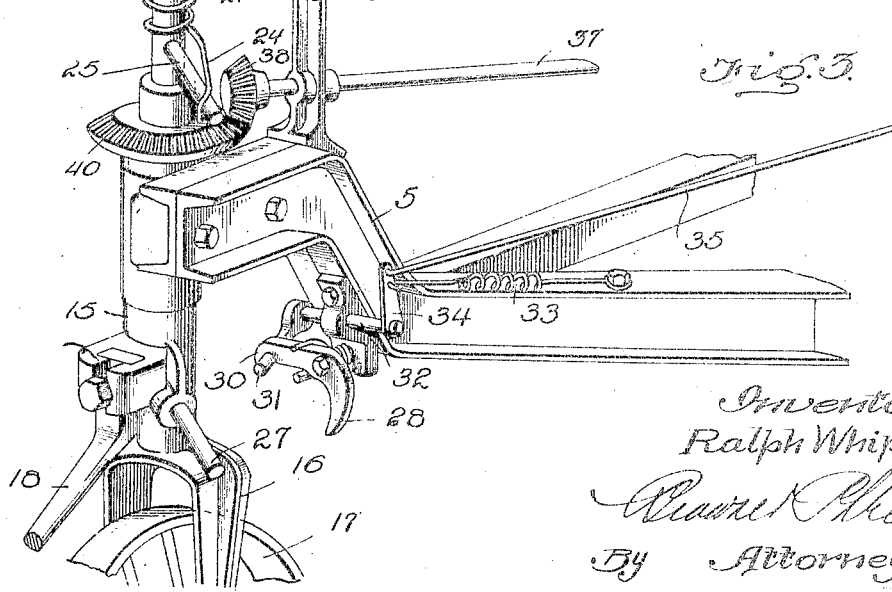
Inventor
Ralph Whipple
By Attorneys

UNITED STATES PATENT OFFICE.

RALPH WHIPPLE, OF DETROIT, MICHIGAN.

TRACTOR.

1,326,314.

Specification of Letters Patent.  Patented Dec. 30, 1919.

Application filed April 28, 1919. Serial No. 293,136.

*To all whom it may concern:*

Be it known that I, RALPH WHIPPLE, a citizen of the United States, residing at Detroit, in the county of Wayne and State of Michigan, have invented certain new and useful Improvements in Tractors, of which the following is a specification.

This invention relates to improvements in tractors, and more particularly to control means for tractor plows and the like, such as illustrated and described in my prior Patent Number 1,296,027, March 4, 1919.

One of the objects of the present invention is to provide an improved form of control means for agricultural implements or tractors of the above general character which will be of simple and practical construction and reliable and efficient in use and operation. A further object is to provide a device of the above general character which will be substantially automatic in its operation to stop the tractor when the same leaves the furrow. A further object is to provide a device of the last above mentioned character which while automatic in its operation will also be susceptible of manual operation, whereby the device may be controlled when traveling over level ground by the operator without requiring him to leave his seat.

These and other objects will be apparent from the following description.

In the accompanying drawing wherein is shown one of various possible embodiments of the present invention, Figure 1 is a side elevation of such parts of a tractor plow with the present invention applied thereto as are necessary to fully understand the same;

Fig. 2 is a plan view of the mechanism shown in Fig. 1;

Fig. 3 is a detail perspective view showing the steering control means.

While the invention is hereinafter described with particular relation to its application to tractor plows, it is of course to be understood that without material modification certain features thereof are applicable to other agricultural implements.

In the accompanying drawing 5 designates the frame of a tractor plow provided with a seat 6, a steering wheel 7, and an engine 8. The engine is of course connected by means of a chain or belt 10 with tractor wheels 11 and 12 between which a plow 13 or other implement is adapted to be placed. The wheel 11 travels in the previously formed furrow and is of larger diameter than the wheel 12 which travels upon the level ground. On the forward end of the frame 5 is mounted a vertical shaft 15 carrying a bracket 16 at its lower end in which a guide wheel 17 is mounted. Also on this shaft 15 is a forward projecting arm 18 carrying a roller or pilot device 20, as shown in Fig. 1, which is normally held against the side of the furrow by means of a spring 21, one end 22 of which bears against a fixed bracket 23 mounted on the frame 5, while its lower end 24 engages an arm 25 mounted upon the upper part 26 of shaft 15. These parts are similar to those described in my prior patent, and are so constructed, positioned and arranged as to cause the guide wheel 17 to turn to the left if for any reason the roller 20 fails to coact with the side wall of the furrow. This is adapted to cause a shutting off of the engine and a stopping of the tractor. This last mentioned function may be accomplished in any desired manner, but I propose to employ a pin or arm 27 which, when it swings backwardly toward the right, Fig. 3, will coact with a pivoted lug 28 to release a catch 30 at its opposite end, thereby allowing a pin 31 forming one end of a bell crank lever 32 pivoted in the frame 5 to move upwardly under the action of a spring 33, causing the opposite arm 34 of the bell crank lever to move relatively rearwardly with respect to the machine, thus moving the rod 35 in a direction to actuate a valve 36 connected with a carbureter or other source of supply of fuel for the engine 8.

It will be noted that the steering wheel 7 is mounted on a rod 37, the opposite end of which carries a pinion 38 meshing with a similar pinion or beveled gear 40 on the shaft 26. This will permit the tractor to be steered by hand at all times and also aid in the re-setting of the guide roller 20 when the same has left the furrow.

It is believed the construction, method of use and operation of the device herein shown and described is clear from the above description, and a further statement thereof is unnecessary.

The present invention is of simple and practical construction and may be easily and quickly applied to tractor plows now in general use without material modification, I realize that considerable variation is possible in the details of construction and arrangement of parts without departing from the spirit of my invention, and I therefore do not intend to limit myself to the specific form shown and described.

I claim:

1. In combination with a tractor provided with a source of power and control means therefor, automatic steering mechanism associated therewith comprising a pilot device connected with the steering mechanism adapted to travel in a furrow and be held from turning by contact with the wall thereof, means for holding said pilot device against a furrow wall, connections between the steering mechanism and the power control adapted to be actuated when the pilot device leaves the furrow, and manually operated means within reach of the operator adapted to restore said parts to normal position.

2. In combination with a tractor provided with a source of power and control means therefor, steering mechanism comprising a wheel-equipped post, a pilot device connected with said post and adapted to travel in a furrow and against the wall thereof, means tending to normally turn said steering mechanism and pilot device to a position at substantially right angles to the tractor frame, connections between the steering mechanism and the power control adapted to be actuated by the steering mechanism when the same is turned by said turning means when the pilot device turns from contact with the furrow wall, and hand operated means within reach of the operator adapted to reset the pilot device after such operation.

3. In combination with a tractor provided with a source of power and control means therefor, steering mechanism comprising a wheel-equipped post, a pilot device connected with said post and adapted to travel in a furrow and against the wall thereof, means tending to normally turn said steering mechanism and pilot device to a position at substantially right angles to the tractor frame, connections between the steering mechanism and the power control adapted to be actuated by the steering mechanism when the same is turned by said turning means when the pilot device turns from contact with the furrow wall, and hand control means within reach of the operator adapted to hold said steering means in any desired position when said tractor is traveling over level ground.

4. In combination with a tractor provided with a source of power and control means therefor, automatic steering mechanism associated therewith comprising a wheel-equipped post, a pilot device carried thereby and adapted to travel in a furrow and normally held against the wall thereof, means adapted to stop said source of power when said pilot device leaves the furrow, and manually controlled means adapted to prevent the actuation of said first mentioned means when desired.

5. In combination with a tractor adapted to carry soil engaging implements, a gas engine for driving said tractor, automatic steering and control means associated with said tractor, and manually operated means for controlling and resetting said automatic steering and control means.

6. In combination with a tractor, adapted to carry soil engaging implements, a gas engine for driving said tractor, automatic steering and control means associated with said tractor, said automatic steering and control means comprising a member adapted to travel in a furrow or the like and to automatically follow said furrow, and manually operated means for controlling said member when traveling over level ground and for resetting the same in a furrow.

7. In combination with a tractor adapted to carry soil engaging implements, a gas engine for driving said tractor and automatic steering and control means associated with said tractor, said automatic steering and control means comprising a wheel adapted to follow the furrow or the like whereby the tractor is guided thereby, means actuated by a turning of said wheel beyond a predetermined angle for stopping the engine, and manually operated means for rendering inoperative said automatic means.

8. In combination with a tractor adapted to carry soil engaging implements, a gas engine for driving said tractor and automatic steering and control means associated with said tractor, said automatic steering and control means comprising a guide member adapted to travel in a furrow or the like and to automatically steer the tractor in a direction parallel to said furrow, means for urging said guide member into engagement with a side wall of the furrow, means adapted to stop the gas engine when said guide means leaves the furrow, and manually operated means to cause said guide member and steering wheel to travel in any desired direction.

In testimony whereof I affix my signature in presence of two witnesses.

RALPH WHIPPLE.

Witnesses:
 CARL CARLSON,
 ROVINA R. BURTON.